US011235509B2

(12) United States Patent
Pinegger

(10) Patent No.: US 11,235,509 B2
(45) Date of Patent: Feb. 1, 2022

(54) DEVICE AND METHOD FOR TRANSPORTING FILM

(71) Applicant: GLOBRA GmbH, Salzburg (AT)

(72) Inventor: Wolfgang Pinegger, Schladming-Rohrmoos (AT)

(73) Assignee: GloBra GmbH, Salzburg (AT)

( * ) Notice: Subject to any disclaimer, the term of this patent is extended or adjusted under 35 U.S.C. 154(b) by 289 days.

(21) Appl. No.: 16/217,561

(22) Filed: Dec. 12, 2018

(65) Prior Publication Data
US 2019/0134883 A1 May 9, 2019

Related U.S. Application Data

(63) Continuation of application No. PCT/EP2016/063514, filed on Jun. 13, 2016.

(51) Int. Cl.
*B29C 55/20* (2006.01)
*B29C 55/08* (2006.01)
*B29K 101/12* (2006.01)
*B29C 31/08* (2006.01)

(52) U.S. Cl.
CPC .............. *B29C 55/20* (2013.01); *B29C 55/08* (2013.01); *B29C 31/08* (2013.01); *B29K 2101/12* (2013.01)

(58) Field of Classification Search
CPC ......... B29C 55/20; B29C 55/08; B29C 31/08; B29C 55/14; B29C 55/143; B29C 55/18; B29K 2101/12
See application file for complete search history.

(56) References Cited

U.S. PATENT DOCUMENTS

| 5,517,737 A * | 5/1996 | Viltro ..................... B65H 20/06 26/88 |
| 2011/0039084 A1* | 2/2011 | Maki ....................... B29C 55/20 428/220 |
| 2011/0200702 A1* | 8/2011 | Harada ................... B29C 55/08 425/397 |
| 2013/0037988 A1* | 2/2013 | Fujinaga ................. B29C 55/08 264/216 |
| 2016/0151960 A1* | 6/2016 | Gumpinger ............. B29C 55/20 425/403.1 |

FOREIGN PATENT DOCUMENTS

| CN | 104723546 B | 4/2017 | |
| DE | 2360335 A1 | 6/1975 | |
| EP | 0236171 A1 * | 9/1987 | ............ B29C 55/20 |
| EP | 3275625 A1 | 1/2018 | |

(Continued)

OTHER PUBLICATIONS

English translation of EP-0236171-A1 by EPO. (Year: 1987).*

(Continued)

*Primary Examiner* — Leith S Shafi
*Assistant Examiner* — Inja Song
(74) *Attorney, Agent, or Firm* — Myers Wolin, LLC

(57) ABSTRACT

Method and device for the transport of foil in a transport direction, in particular, for an stretching plant, wherein at least one upper moving rope and at least one lower moving rope are guided, and the at least one upper moving rope and the at least one lower moving rope clamp the foil at its lateral edge at least in places and take it along.

13 Claims, 15 Drawing Sheets

(56) References Cited

FOREIGN PATENT DOCUMENTS

WO      2010/046738 A1     4/2010
WO      2014/208016 A1    12/2014

OTHER PUBLICATIONS

International Search Report issued for corresponding International Patent Application No. PCT/EP2016/063514 dated Feb. 21, 2017.
Notice of Reasons for Rejection issued by the Japanese Patent Office for corresponding Japanese Patent Application No. 2019-517138, dated Jun. 29, 2020.

* cited by examiner

DEVICE AND METHOD FOR TRANSPORTING FILM

CROSS REFERENCE TO RELATED APPLICATIONS

This application is a continuation of International Application No. PCT/EP2016/063514, filed on Jun. 13, 2016, the contents of which are incorporated by reference herein.

BACKGROUND OF THE INVENTION

The present invention relates to a base structure, a device, and a method for the transport of foil. Such base structures, devices, and methods are used for the production of foils, in particular, endless foils made from plastic material, which can be stretched.

Usually, the production of such endless foils is carried out by applying melted plastic granulate (the so-called melt) onto a moving cooling body, where it forms a foil film while being cooled and being taken along by the moving cooling body. The cooled foil then is separated from the cooling body. This cooled foil also is referred to as the "cast film". Subsequently, the phases of reheating the thus created foil and the stretching of the foil, and namely, e.g., in foil transport direction (Machine Direction, MD), transverse with respect to the transport direction (Transverse Direction, TD), and eventually thermo-fixing (Heat Setting), cooling, cutting the edges, further processing and winding of the foil, e.g. onto a roll, are carried out.

In the following, with respect to the term of the foil or the foil film, the "cast film" is meant, namely, the (endless) foil, which is presented after cooling and separation from the cooling body. This endless foil already may—however, but does not have to—have been stretched.

The foils may be of all types, which may be produced by application of a material from a melt by means of extrusion, e.g., by means of a flat nozzle in one or more layers onto the surface of a rotating chill roll and by the subsequent cooling resulting therefrom. This also concerns foils, which may be cooled at the same time on the side facing away from the chill roll by means of air, water or by means of further rolls, or in other ways. However, this does not exclusively concern all poly-olefin plastic materials, as polypropylene (PP) and polyethylene (PE), polyester (e.g., PET), polyamide, poly-actide (PLA), polystyrene, polycarbonates, and all other materials not falling under the definition mentioned above.

In the following, the terms "stretching", "stretching", "drawing", and terms deduced therefrom are used synonymously.

FIG. 1 shows a typical plant (or a plant part) for heating polypropylene foil to be stretched (area I) for the subsequent TD stretching (area II) as well as annealing (area III) and cooling (area IV), upper figure in side view, lower figure in top view. The subdivision into four areas also is applicable for the foil transport device according to the invention. In the following, the areas I and II are looked at more closely.

In the known foil transport devices, the foil is gripped at the inlet 11 of the plant laterally by means of clips in a chain track system, and is transported through the heating zone (area I). In the stretching zone (area II), the clips at either sides change their direction and run outwards, whereby the foil is stretched transversely with respect to the transport direction. In the annealing and in the cooling zone, the system may also change its direction or may only be used for the transport of the foil. At the outlet 19 of the plant, the foil is released again.

This plant has an integrated heater with hot air. The transition between the heating zone (area I) and the stretching zone (area II) is shown in FIG. 2 for the right hand side (seen in MD) of the chain track system.

The chain track system having clips, which slide (sliding chain), and those, which may be advanced by means of roller bearings (roller chain) are distinguished. Sliding chains operate with sliding members, which guide the clips on the rail. The sliding members have to be made from plastic material, and have to be lubricated, which is expensive and causes contaminations. These systems cannot be used for certain foils, as PET foils.

Roller chains operate with 7-9 roller bearings, namely, rolls with ball bearings per clip. They basically operate with much less lubricants, are expensive, and due to the high number of bearings (many thousands), mechanical problems are easily caused; if only one of these bearings breaks, then the entire system is destroyed or at least disabled.

In the pre-heating zone (area I), the annealing zone (area III), and the cooling zone (area IV), there are no or only very little lateral forces. The very thin and very lightweight foil is supported on both sides only.

In the stretching zone (area II), also, lateral forces result from the transverse stretching of the foil. However, there, the foil is very hot, and will become thinner during passing through the stretching zone. The necessary lateral forces for the stretching of the foil and the forces and the energy of the massive chain track systems stand in no reasonable relation to each other.

In the prior art, due to other solutions, for chain track systems having clips, a massive technology is used for the processing in relation to very low forces.

Thus, for 1 meter chain length, approximately 8 clips are employed on average on each side, and the same amount on the return line. The foil width for an 8.7 meter plant is 1.2 meter at the TDO inlet. The foil thickness, here, amounts to about 140 µm for a film thickness of 20 µm at the end of the stretching zone.

The foil, which here is clipped at both sides over a length of one meter has an area of 1.2 $m^2$ and only weighs a few hundred grams. This remains the same during the entire stretching phase; it widens, but at the same time, it becomes thinner.

For this, systems are used weighing several tons, which themselves are subject to very high frictional and tensile forces with corresponding heat development, but which have to support only a few hundreds of grams of foil during up to 80% of the path, and which are subject to relatively low lateral forces in the stretching zone.

The system has been fine as long as the machines were slow and the pre-heating zone as well as the annealing and cooling zones were relatively short compared to the stretching zone. Now, with respect to faster machines, the stretching zone is relatively short compared to the other zones, and the system is far too complex and prone to error, too heavy, creates enormous tensile forces, friction, heat, etc. and, in fact, only for supporting a few kilograms of foil at both sides.

Sliding systems, as explained above, use thousands of sliding elements, which have to be lubricated. For this, only very expensive special oils can be used due to the heat, and in such systems, oil always is disadvantageous, it must not contact the foil, because it contaminates the latter or it leads to film fractures.

These lubricating systems are not only expensive, but also are extremely complicated and prone to errors.

Roller systems comprise up to 25,000 roller bearings in one machine. These are a great risk for the case that only one of them gets stuck or breaks. Because they are made from very hard steel, this may lead to total breakdown of the entire system. Therefore, the bearings in roller chains are replaced in cycles of approximately two years preemptively, which is extraordinary expensive.

By now, the tensile forces on the chains are that strong due you to its own weight and system (not due to the foil) so that the chain is stretched, and the lubricated chain bolts are worn out very quickly. The lubrication of the chain bolts is very time-consuming and, again, prone to errors. Chain bolts which already are lubricated for their lifetime did not prove to be successful. With these, chain problems up to chain fractures arise. The friction energy involved therewith generates heat and requires complex cooling systems of the chains.

In the end, these very expensive and complicated chain track systems are only used for clipping foil, and to pass it through a very long furnace very fast during a pre-heating, transverse stretching, annealing, and cooling procedure. The mechanical problems described above also lead to procedural problems. The massive steel clips with their gripping elements are located in the very hot zone of the furnace, and heat up correspondingly. The longer the machine, the longer the preheating zone is. Thus, the clips are located in very hot areas over long distances, and the faster the machine, the faster they return from the outlet to the inlet. To cool the massive steel clips that fast becomes more and more difficult, because they easily store the heat. Therefore, more and more complex systems for clip cooling are used, which are intended for preventing the gripping elements from being too hot, when taking up the new foil at the inlet so that they already melt the film partially, thus leading to film tearing.

Moreover, there is a problem with respect to clip hammers for various foil thicknesses. Current plants are designed for foil end thicknesses of 10 to 80 µm, sometimes for "cavitated films" of up to 200 µm. The clips, however, always close equally, and are set to the thinnest foil. Thereby, it could happen that for thick foils and very hot clips, the clip hammers entrench into the foil very deeply, and this also leads to film tearing at the edges at the beginning of the stretching zone, as described below.

At high speed, a further problem arises at the location, where the clip system passes from the straight transport area I into the stretching area II. Because the chain track and thereby, the course of the clips, changes its direction and diverges so as to stretch the foil, besides the beginning transverse stretching, also, an undesired longitudinal stretching is effected, namely, a so-called unscheduled simultaneous stretching, cf. FIG. 2. The latter in a region, in which the foil is retained by clips which are partly too hot and neither in a controlled manner, as heat would be necessary for such a simultaneous stretching.

The foil in the clip and at the edge rather is too hot, because of the hot clip, in between it rather is too cold, because there, no hot air arrives, only the radiation heat of the clip. The foil, up to a certain speed, can bear this; subsequently, it is torn. One has to consider that this unscheduled longitudinal stretching (with a clip distance of 1 cm at an angle of 17 degrees) takes place, in fact, over 3 cm between the two clips. At a speed of 500 m/min, this longitudinal stretching takes place within only approximately 0.0018 s. At 700 m/min, it only takes place within about 0.0012 s. If the opening angle is distributed over several clips, then, this unscheduled longitudinal stretching process is distributed accordingly.

With the systems of prior art, the limits of capacity of the material is reached. With increasingly higher foil output and correspondingly higher rates, the chain track/clip solution is more and more difficult to implement technically and economically.

BRIEF SUMMARY OF THE INVENTION

Therefore, it is an object to provide base structures, devices, and methods for the transport of foil, by means of which the disadvantages described above can be eliminated at least partially. This object is solved by the base structures, devices, and methods according to the claims.

Accordingly, a base structure for a device for the transport of foil is provided, the base structure comprising:
at least an upper guide unit and a lower guide unit, wherein the upper guide unit is configured to guide at least one upper movable rope, and the lower guide unit is configured to guide at least one lower movable rope, wherein
the at least one upper rope and the at least one lower rope can be arranged so as to clamp the foil at its lateral edge at least in places and take it along, and wherein
at least one guide unit of the guide units is configured to push the foil, by means of the at least one guided rope, against the at least one rope guided by the other guide unit.

The chain/clip solution for the transport of the foil known from prior art, thus, is replaced by a solution with guided ropes. This leads to a simplification of the structure. At the same time, higher transport rates are possible, because ropes may be driven, moved, and deflected very well.

The lower guide unit may be configured to be movable horizontally, and the upper guide unit may be fixed to the lower guide unit.

A guide unit may comprise a number of roller elements, which are configured to guide the respective at least one rope.

At least one roller element of the number of roller elements at the at least one lower guide unit may be arranged below the at least one rope guided by the at least one lower guide unit.

At least one roller element of the number of roller elements at the at least one upper guide unit may be arranged above the at least one rope guided by an upper guide unit.

At least one roller element of the number of roller elements at the at least one lower guide unit may be arranged horizontally adjacent to the at least one rope guided by the at least one lower guide unit.

At least one roller element of the number of roller elements at the at least one upper guide unit may be arranged horizontally adjacent to the at least one rope guided by the at least one upper guide unit.

At least one roller element of the number of roller elements at the at least one lower guide unit may comprise a rotation axis, which is inclined towards the vertical line and towards the horizontal line, in particular, at 45° with respect to the vertical line.

At least one roller element of the number of roller elements at the at least one upper guide unit may comprise a rotation axis, which is inclined towards the vertical line and towards the horizontal line, in particular, at 45° with respect to the vertical line.

At least two roller elements of the number of roller elements at the at least one lower guide unit may be arranged horizontally adjacent to the at least one rope guided by the at least one lower guide unit, wherein one of the at least two roller elements is arranged on the one side of the at least one rope, and at least one roller element of the at least two roller elements is arranged on the other side of the at least one rope, and the two roller elements are arranged on a common line perpendicular to the at least one rope.

At least two roller elements of the number of roller elements at the at least one upper guide unit may be arranged horizontally adjacent to the at least one rope guided by the at least one upper guide unit, wherein one of the at least two roller elements is arranged on the one side of the rope, and at least one roller element of the at least two roller elements is arranged on the other side of the rope, and the two roller elements are arranged on a common line perpendicular to the rope.

At least two roller elements of the number of roller elements may be arranged such that they clamp the at least one guided rope inbetween them. The clamping of the foil may be effected by roller elements lying at mutually opposite sides and their pressure on the ropes. The ropes transmit the pressure to the foil.

The foil may be clamped between the at least one upper rope on the upper foil surface and the at least one lower rope on the lower foil surface.

The at least one upper guide unit and the at least one lower guide unit may be displaceable against each other in horizontal direction in order to affect the clamping of the foil.

At least one rope may be an endless rope, in particular, a rope made from steel.

At least one rope may be made from plastic material or may comprise a proportion of plastic material, in particular, a sleeve and/or a core made from plastic material. The entire configuration and arrangement of the ropes, thereby, optimizes the clamping of the foil.

At least one rope may (e.g., in its core) comprise devices for measurement of process data, as e.g., temperatures and/or data lines and for transmission of the process data or data derived therefrom to the exterior of the rope.

Also, the invention comprises a device for the transport of foil in a transport direction, in particular, for an stretching plant, comprising:
at least two base structures, as described above, wherein in transport direction, the one base structure is arranged at the right side and the other base structure, in transport direction, is arranged at the left side, wherein the at least two base structures are configured to guide the ropes guidable by them respectively at the same velocity.

Further, the device may comprise: at least one roller element, respectively, for driving a rope and/or at least one roller element, respectively, for tensioning at least one rope.

Further, the device may comprise: an inlet portion, at which the at least one upper rope and the at least one lower rope form an angle, which in a vertical plane is opened against the transport direction such that the foil may be inserted between the ropes.

Further, the device may comprise: an stretching portion, in which the left ropes and the right ropes are guided such that, in transport direction, they diverge at an angle, which is opened in transport direction such that the foil can be stretched between the ropes.

Further, the device may comprise: an outlet portion, at which the at least one upper rope and the at least one lower rope form an angle, which is opened in a vertical plane in the transport direction such that the foil can be released from a clamping between the ropes.

Further, the device may comprise: a roller element at the outlet portion, wherein the roller element is arranged adjustably in order to adjust the outlet width of the foil.

Each base structure may be configured so as to fix the ropes in a transverse direction with respect to the transport direction and vertically with respect to the transport direction, wherein roller elements are provided respectively, which contribute to the fixation.

Further, the device may comprise: a heating means for heating the ropes.

Further, the device may comprise: a cooling means for cooling the ropes.

Further, the device may comprise: a measuring and control means for temperature control of the ropes and/or the guide units.

Further, the invention provides a method for the transport of foil in a transport direction, in particular, for an stretching plant, wherein at least one upper moving rope and at least one lower moving rope are guided, and
the at least one upper guided rope and the at least one lower guided rope clamp the foil at its lateral edge at least in places and take it along.

The method may be implemented in a device according to the invention.

In transport direction, the foil may be guided at the left side and at the right side.

The ropes may be guided by roller elements.

Each rope may be tensioned by at least one roller element and each rope may be driven by at least one roller element.

Temperatures of at least one rope may be measured and adjusted.

Further, parameters (e.g., temperatures), which are measured in at least one of the ropes, may be transmitted to the outside from at least one rope.

Further, the invention also provides a foil, in particular, an endless foil, which is produced or which may be produced by applying the method described above.

The foil may be a polyolefin raw material, polyester, polyamide, PLA, polystyrene, polycarbonate.

The foil may be a semi-crystalline thermoplastic plastic material.

Usually, the foil is an endless foil.

The use of rope and roller systems instead of clip or chain systems also enables a higher plant speed and higher throughput performance, thus, a higher output of the plant with a simpler structure.

BRIEF DESCRIPTION OF THE SEVERAL VIEWS OF THE DRAWINGS

The invention and embodiments are described in further detail by means of the drawing, in which.

DETAILED DESCRIPTION OF THE INVENTION

In the entire text, specifications with respect to the orientation as "left", "right", "top", "lateral" are referred to the transport direction MD and to the foil 100, as far as not otherwise indicated.

Figure 3:
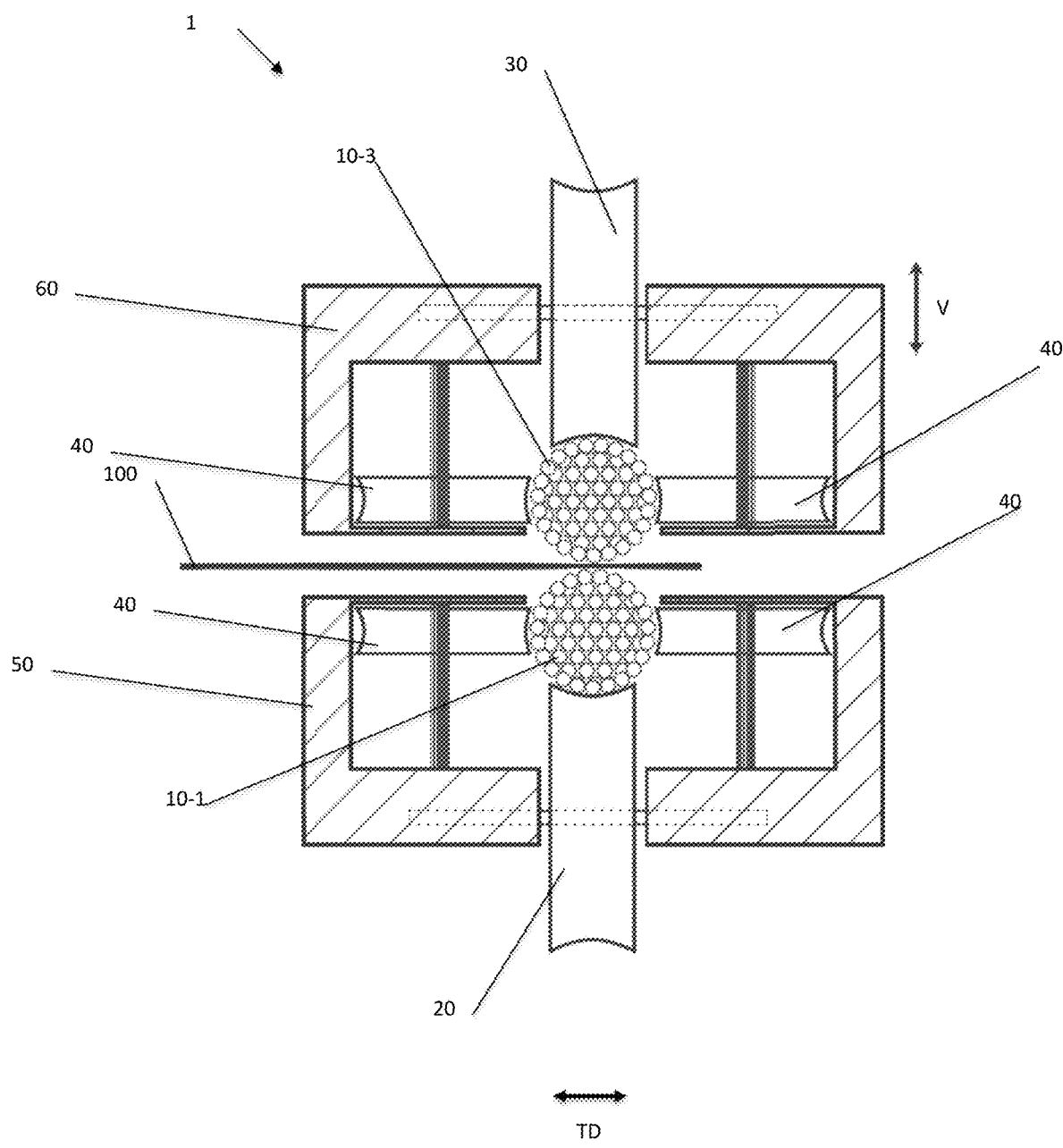
FIG. 3 shows a base structure according to a first embodiment of the invention.

FIG. 3 illustrates basic principles of the invention by means of the first embodiment of the invention. The base structure 1 according to the invention for a device for the transport of foil 100 comprises: at least one upper guide unit 60 and a lower guide unit 50, wherein the upper guide unit 60 is configured so as to guide at least one upper rope 10-3, and the lower guide unit 54 is configured so as to guide at least one lower movable rope 10-1, wherein the at least one upper rope 10-3 and the at least one lower rope 10-1 are arranged so as to clamp the foil 100 at its lateral edge at least in places and to take it along, wherein each guide unit 50, 60 is configured for guiding at least one rope 10-1, 10-3, and wherein at least one guide unit 60 of the guide units 50, 60 is configured so as to push the foil 100 by means of the at least one rope 10-3 guided by the guide unit 60 against the at least one rope 10-1 guided by the other guide unit 50, and wherein the lower guide unit 50 is configured so as to support the upper guide unit 60. In FIG. 3, only the upper guide unit 60 is configured so as to push vertically, as this is indicated by the double arrow V.

The foil 100 rests on the at least one lower rope 10-1, and is clamped by the at least one lower rope 10-1 as well as the upper rope 10-3. In this manner, the foil 100 may be transported in transport direction by means of the movable ropes.

The upper guide unit 60 is referred to as being that one, the rope 10-3 of which contacts the foil 100 at its upper side, the lower guide unit 50 is that one, that the at least one rope 10-1 of which contacts the foil 100 at its lower side.

The upper guide unit 60 or a part thereof is configured so as to be movable vertically. Thus, the bearing of the roller elements of the upper guide unit is configured such that the pressure can be measured and adjusted.

Each guide unit 50, 60 respectively, comprises at least one roller element 20, 30, 40, which is configured so as to guide the respective at least one rope 10-1, 10-3. The lower guide unit 50 is configured so as to be movable horizontally, and the upper guide unit 60 is fixed to the lower guide unit 50 movably. In the example of FIG. 3, the upper guide unit 60 comprises at least one roller element, which is arranged above the rope 10-3 guided by the upper guide unit, and at least one roller element, which is arranged horizontally adjacent to the rope 10-3 guided by upper guide unit. The lower guide unit 50 comprises at least one roller element, which is arranged below the rope 10-1 guided by the lower guide unit, and at least one roller element, which is arranged horizontally adjacent to the rope 10-1 guided by the lower guide unit 50.

In vertical direction, the lower guide unit 50 is immobilized. Its length corresponds to a furnace zone, typically, this is about 4 m. It rests on a construction provided for this, e.g., on columns. The lower guide units 50 are displaceable horizontally on these columns, in terms of the stretching.

The upper guide unit 60, thus, is movable horizontally together with the lower guide unit 50, and also allows for influencing the pressure onto the upper rope 10-3 and thereby, the clamping force on the foil 100. The upper guide unit 60 usually has the same length as the lower guide unit 50, at which it is fixed.

The base structure 1 according to the invention may comprise several areas or may be subdivided into several areas. The guide units 50, 60, in one area, may be different from the guide units 50, 60 in another area. The areas may—however, do not have to—correspond to the areas I to IV described at the beginning.

The clamping force onto the foil 100 is created by the pressure of the upper rope 10-3 against the lower rope 10-1. The clamping force on the foil 100 is adjusted by means, which act on the upper guide units 60 or parts thereof. These means, in addition to the gravitational force of the upper guide units 60 and of the upper ropes 10-3, may comprise devices, which apply pressure onto the upper guide units 60 or parts thereof, which the latter transmit via the rope 10-3. These devices may act, e.g., pneumatically and/or electrically. Additionally, devices may be provided, which detect the pressure of the clamping, and depending on the detected pressure, adjust the pressure on to the respective upper guide units 60 or parts thereof.

Each rope 10-1, 10-3, here, is an endless rope, in particular, a rope made from steel. Such an endless rope may be produced, e.g., by means of splicing the ends of a rope.

The ropes may have a core made from plastic material or may have e.g., a rough surface and/or a plastic sleeve around a metal or plastic rope.

Also, the ropes may be pure plastic ropes or may consist of a mixture of steel and plastic material. The ropes may also have a smooth surface or may be coated correspondingly with a plastic sleeve.

At least one rope may (e.g., in its core) comprise devices for measuring process data, as for example, temperatures and/or data lines and for transmission of the process data or data derived therefrom to the outside of the rope.

By the selection of the materials for the ropes, the clamping effect as well as the temperature of the ropes may be influenced. Thus, a rope having a plastic proportion may be kept at a lower temperature more easily, and thus may be cooled better, because it only takes up less heat. A rope, which has a lower temperature as compared to the foil may be more efficient with respect to the adhesion of the relatively warmer foil at the rope.

The ropes may be cooled very efficiently in the guide units 50, 60. The quality of the surface of the ropes also matters during clamping, stretching, and transport of the foil. Thus, by means of roughening the surface or by means of a very smooth surface, the adhesion of the foil may be influenced independently of the clamping. For example, a certain slip of the foil may be promoted in the one direction (e.g., in MD) by a direction-anisotropic quality (roughness, smoothness) of the ropes, while the slip in the other direction (e.g., in TD) is reduced or even completely prevented. Hereby, path differences of the ropes may be compensated for an offset arrangement at the transition between the area I and the area II.

Slip may be prevented completely by particularly smooth rope surfaces, as they may be achieved e.g. by coating the rope with a plastic sleeve.

Also, the upper rope 10-3 may have another (in particular, an opposite) direction of lay than the at least one lower rope 10-1, 10-2. Then, the strands of the upper rope 10-3 and the at least one lower rope 10-1, 10-2 may be situated within each other in a better manner, with an additional effect with respect to slip and clamping of the foil 100.

Further, the ropes may be of different thicknesses. Thus, for example, the at least one lower rope 10-1 or 10-2 may be thicker than the upper rope 10-3.

The roller elements 20, 30, 40, 45, with their treads, may encompass and thus, guide the ropes, respectively, in a more or less strong manner.

Figure 1:
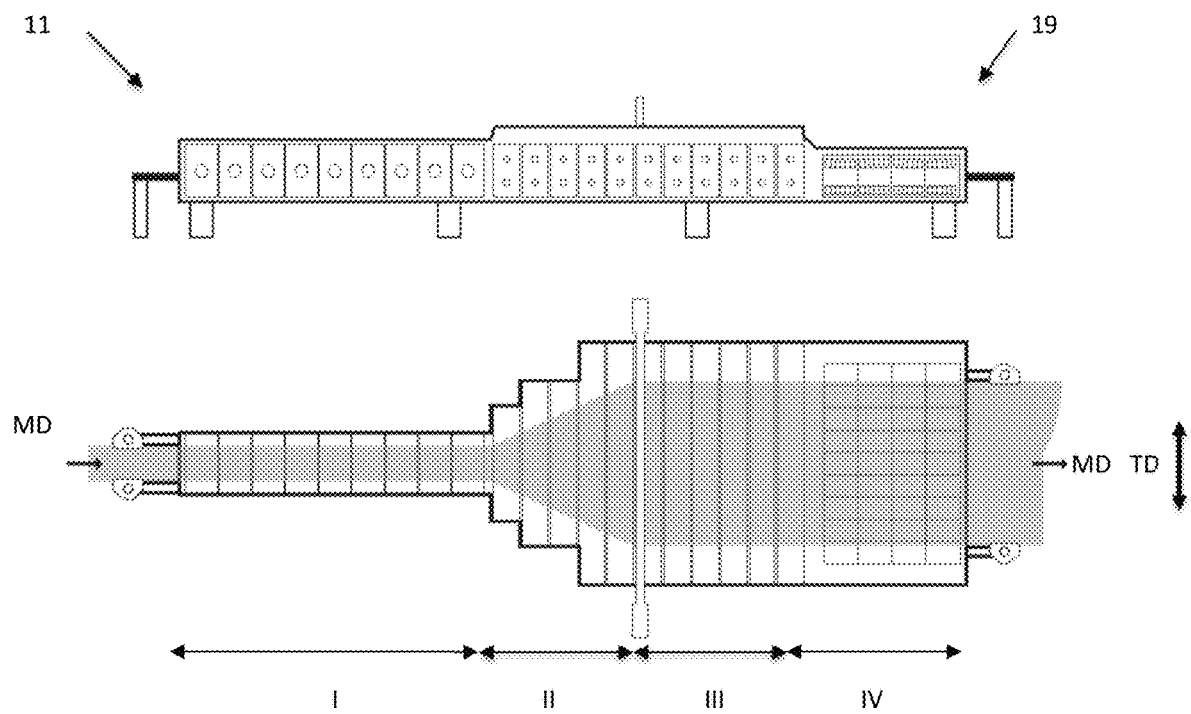
FIG. 1 shows a foil transport device according to the prior art.
Figure 2:
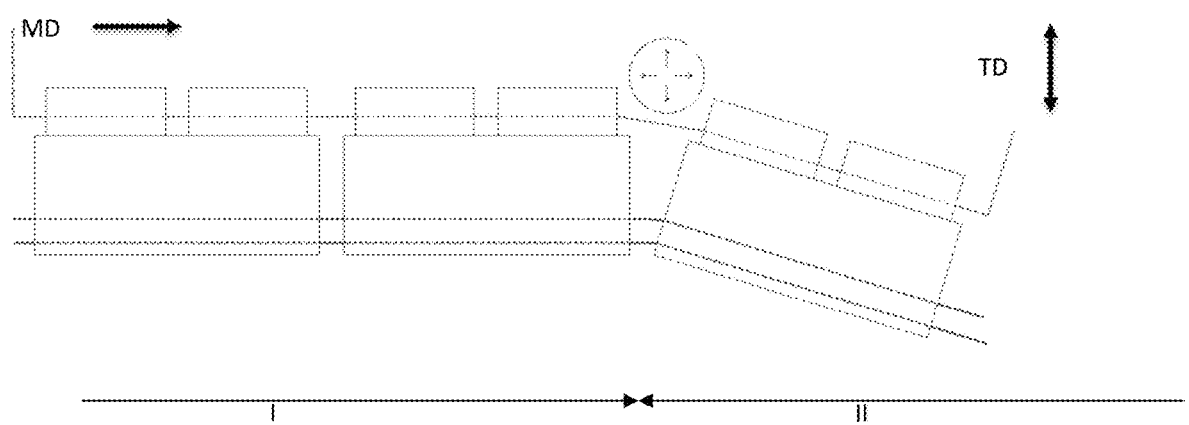
FIG. 2 shows the transition between the heating area and the stretching area for the transport device of FIG. 1.

At least two basic structures 1 together form a device for the transport of foil 100 in a transport direction MD, in particular, for an stretching plant, wherein the one base structure 1, in transport direction MD, is arranged on the left side and the other base structure 1, in transport direction MD, is arranged on the right side, wherein the at least two basic structures are configured so as to guide the ropes guided by them, respectively, at the same velocity. The left base structure 1 also is arranged so as to clamp the foil 100 at its left edge, and the right base structure 1 is arranged so as to clamp the foil 100 at its right edge. According to the different requirements to the guidance of the ropes in the areas I to IV (cf. FIG. 1), the base structures may respectively be configured differently. In the following, different variants are described.

Figure 4:
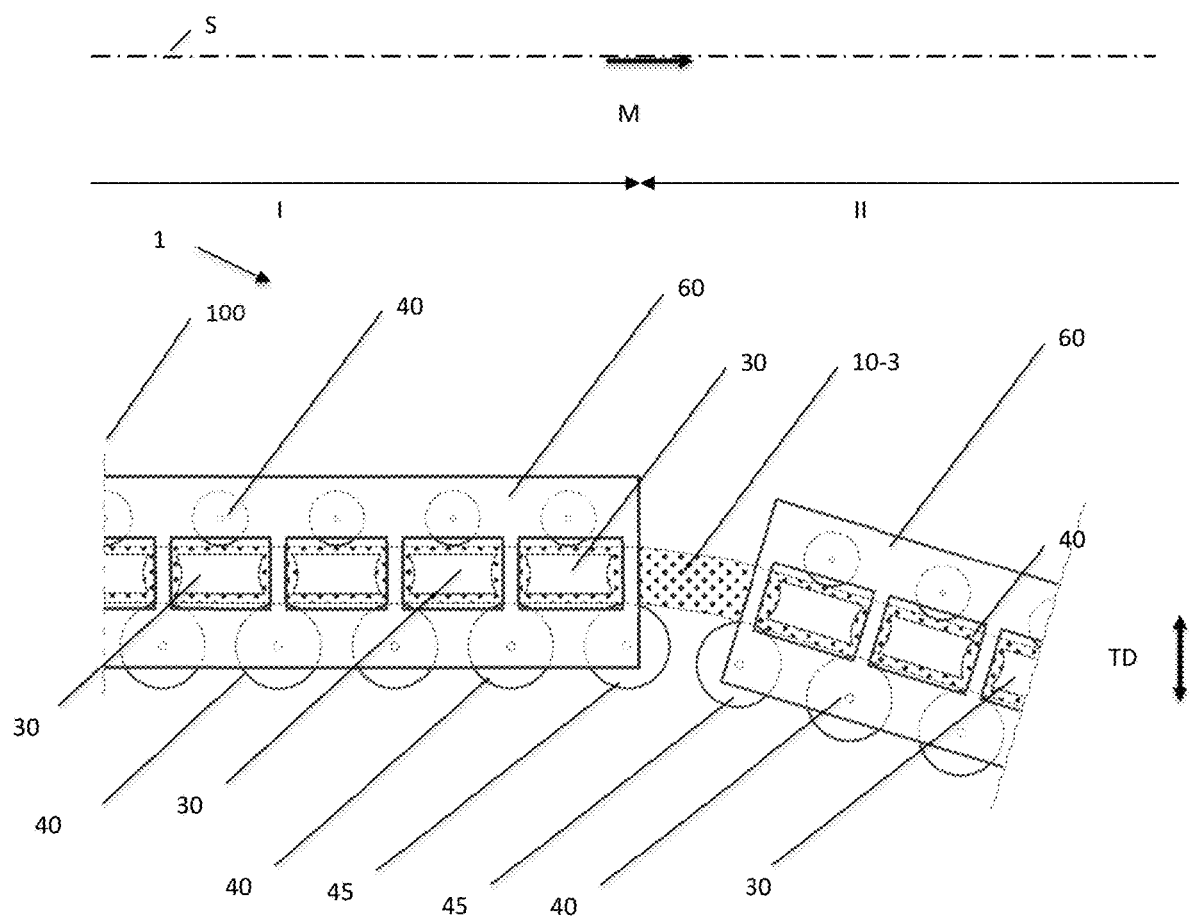
FIG. 4 shows a top view on the base structure according to FIG. 3.

FIG. 4 shows the arrangement with two ropes 10-1-10-3 per side in a top view on the base structure 1. Hereby, only the upper guide unit 60 and the rope 10-3 guided by it can be seen, the lower guide unit 50 and the lower rope 10-1 are concealed. The transition area between the heating zone (area I), on the left side of the figure, and the stretching zone (area II), on the right side of the figure, are shown, and namely, only the right base structure 1. The left base structure 1 would be arranged back-to-front with respect to the symmetry axis S indicated in MD direction. In the heating zone (area I), the left ropes (not shown) are guided in parallel to the right ropes, viewed from the top. In the stretching zone (area II), the left ropes (not shown) and the right ropes, respectively, run outwards with respect to each other, viewed from the top, such that they form an angle opening in transport direction MD. The distance from the left ropes to the right ropes also increases in transport direction MD. By this, the foil clamped between the ropes is stretched in transverse direction TD. For the deflection of the ropes, deflection roller elements 45 are provided, which are arranged in the area of the transition between the pre-heating zone 1 and the stretching zone 2. The lateral guide roller elements 40 may be arranged sideways the respective rope opposing each other or, however, may be arranged offset with respect to each other in MD direction.

The clamping of the foil 100 may be achieved by roller elements 20, 30 arranged one on top of the other in vertical direction, which act on the ropes. In longitudinal direction, these roller elements 20, 30 may lie on a vertical line (respectively running through their center planes), as shown in FIG. 3. Then, the centers of the guided ropes are lying on a vertical line in cross section.

Also, the roller elements may be lying one above each other, but in the horizontal plane, offset crosswise with respect to the transport direction (also in TD direction). Then, the centers of the guided ropes (viewed in cross section) are lying on a vertically inclined, namely, an oblique line. This is shown in the embodiment according to FIG. 5. For this configuration, the clamping force can be adjusted and distributed particularly well, because it is effected by the roller elements 20, 30 acting (predominantly) vertically as well as by the roller elements 40 acting (predominantly) horizontally. Here, the force may be transmitted particularly well to the ropes. Also, the supply of hot air to the ropes may be realized in a better manner.

Figure 5:
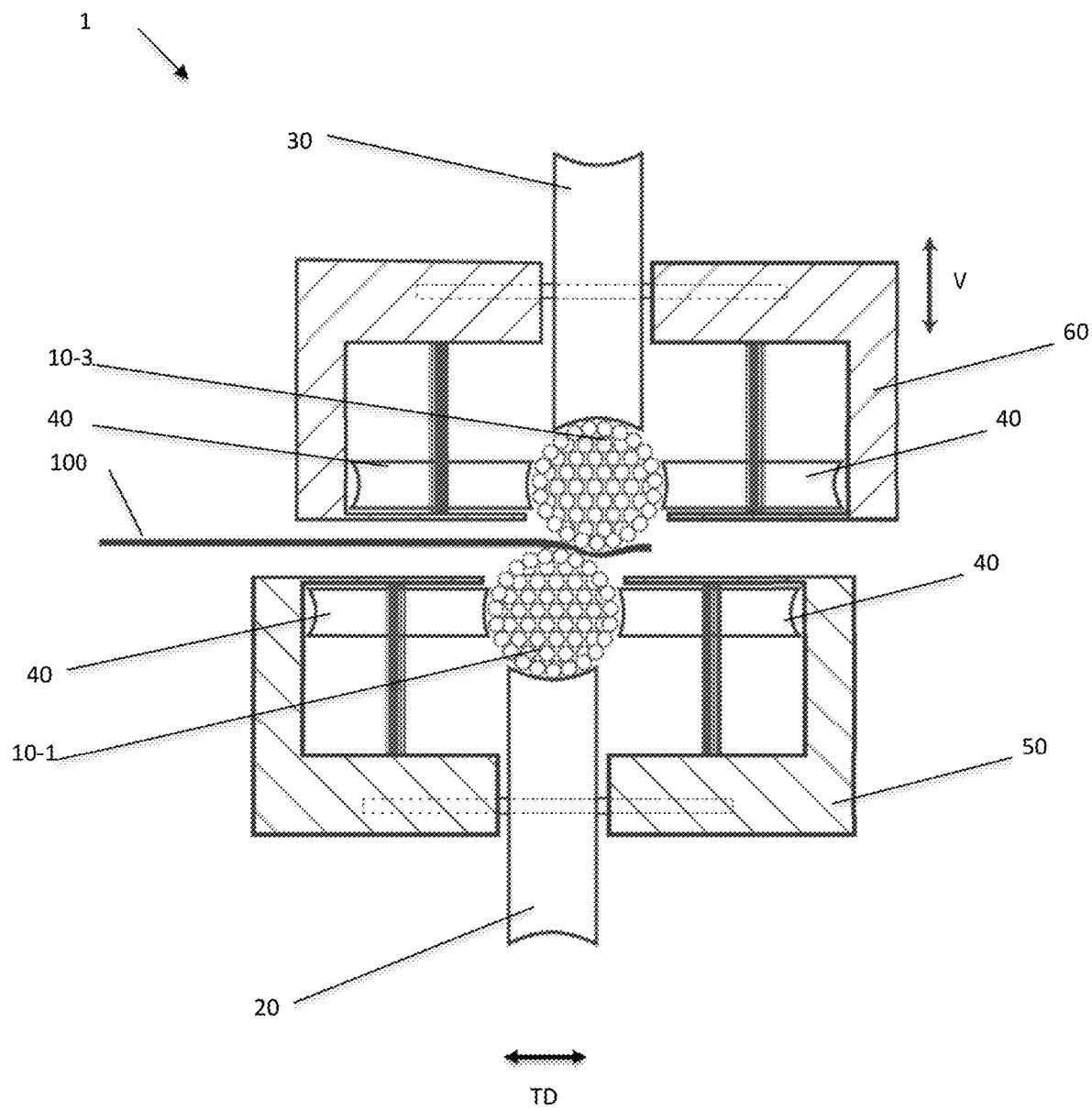
FIG. 5 shows a base structure according to a second embodiment of the invention.

Moreover, here, the wrapping of the foil 100 at least around the lower rope 10-1 transversely with respect to the transport direction (namely, in TD direction) is increased, because the foil 100 (in cross section, viewed according to FIG. 5) is guided around the circumference of the lower rope 10-1 and deflected, and namely, around about the arc length, which corresponds to the inclination angle of the connection line of the centers of the ropes with respect to the vertical line (viewed in cross section according to FIG. 5). The wrapping, thus, leads to an increased contact surface between the rope 10-1 and foil 100, resulting in an increased adhesion of the foil at the rope 10-1.

Figure 6:
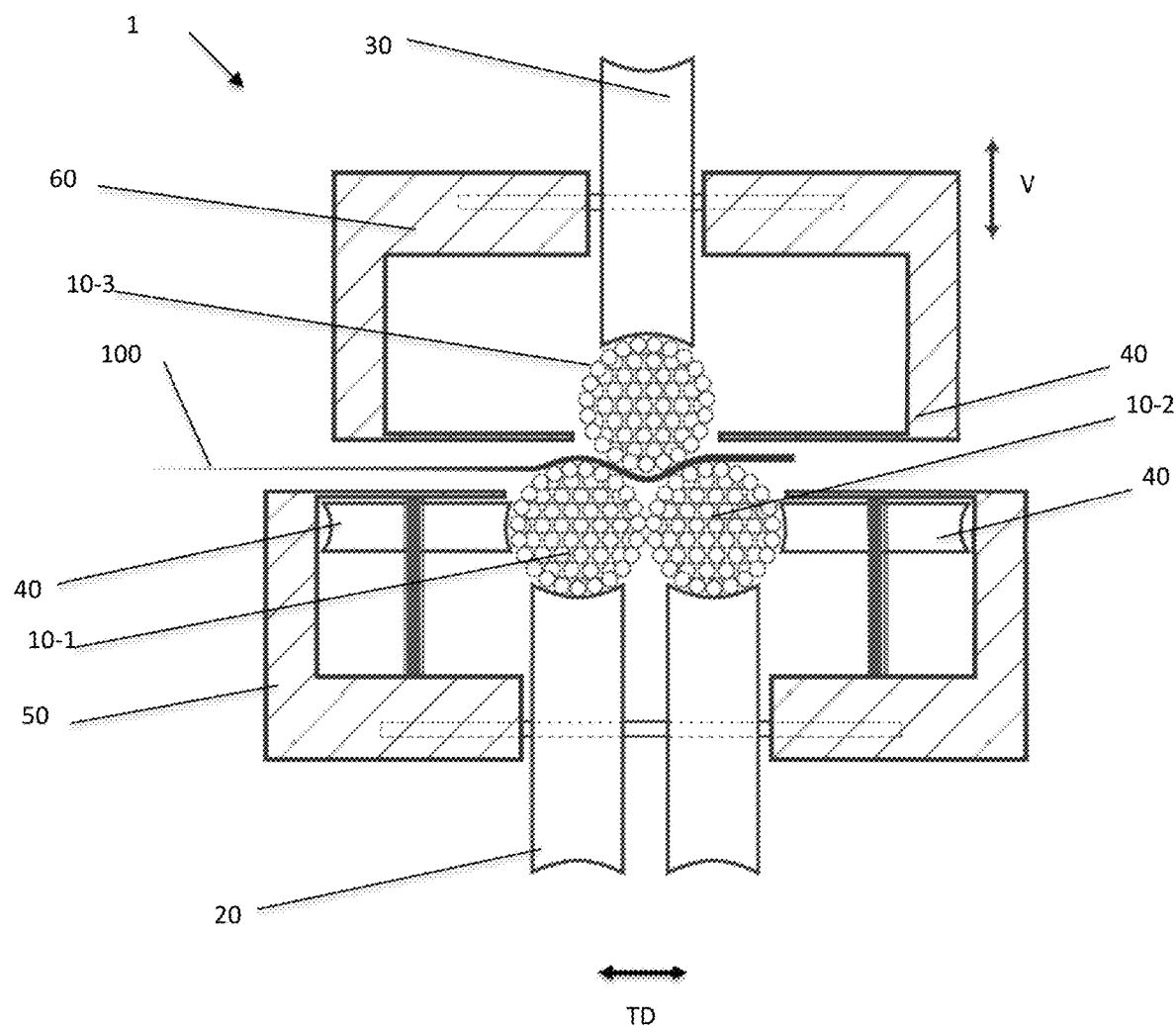
FIG. 6 shows a base structure according to a third embodiment of the invention.

According to a further embodiment, each base structure is configured so as to guide an upper rope 10-3 and two lower ropes 10-1, 10-2, wherein the foil 100 may be clamped between the upper rope 10-3 on the one foil surface and the two lower ropes 10-1, 10-2 on the other foil surface. The lower guide unit 50 leads the two lower ropes 10-1, 10-2, the upper guide unit 60 leads the upper rope 10-3. FIG. 6 shows a base structure according to this embodiment in cross section. The upper rope 10-3 is guided in the roller elements 30 and is pressed against the foil 100. The lower ropes 10-1 and 10-2, respectively, are guided by a lower roller element 20 in the vertical line and by roller elements 30 or 40, respectively, in the horizontal line. According to this embodiment, the centers of the ropes may form an isosceles or equilateral triangle. Here, the foil is held particularly well, because the wrapping of the foil 100, hereby, is increased onto the lower ropes 10-1 and 10-2 as well as onto the upper rope 10-3 (transversely with respect to the transport direction), because the foil is contacted with three ropes over one arc length in transverse direction.

Figure 7:
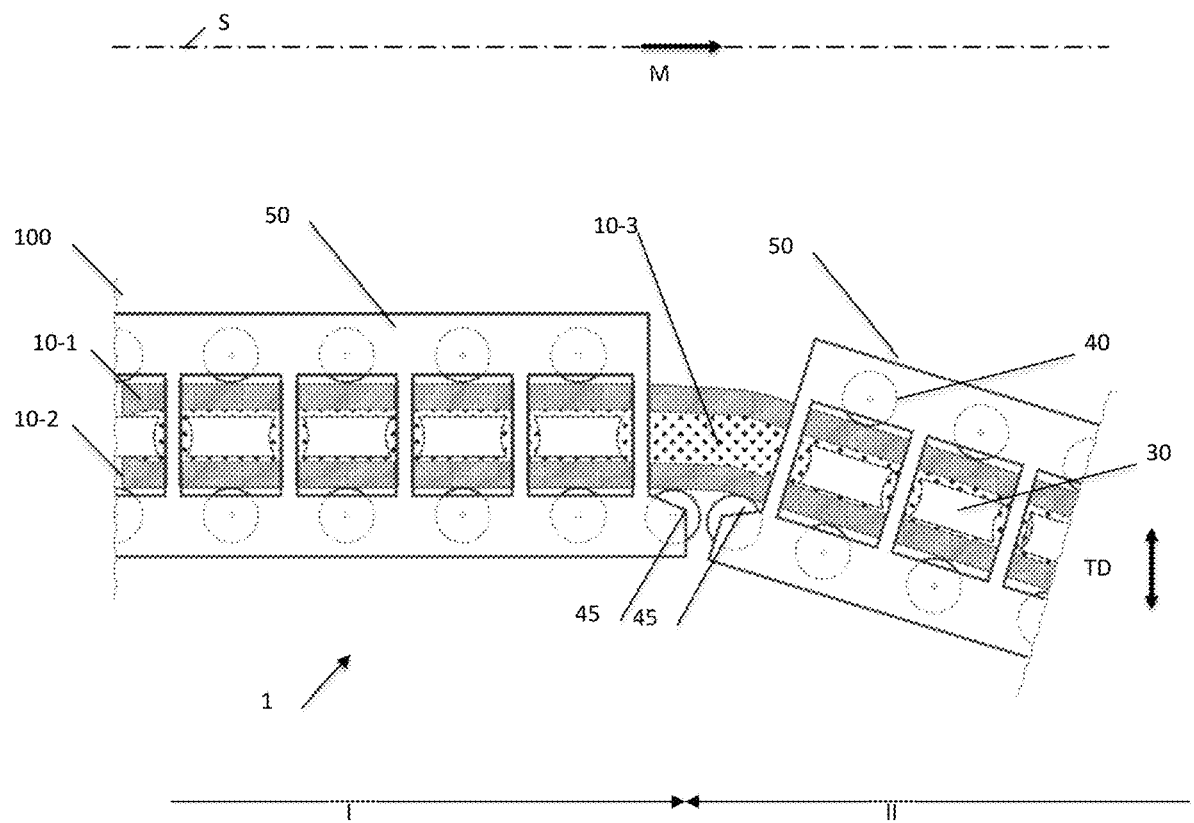
FIG. 7 shows a top view on the base structure according to FIG. 6.

FIG. 7 shows the system with the three ropes 10-1, 10-2, 10-3, schematically, from the top side. For clarity reasons, hereby, the view is cleared to both lower ropes 10-1, 10-2, although the ropes 10-1, 10-3 would be concealed in a horizontal straight section through the parts of the guide unit 50.

Figure 8:
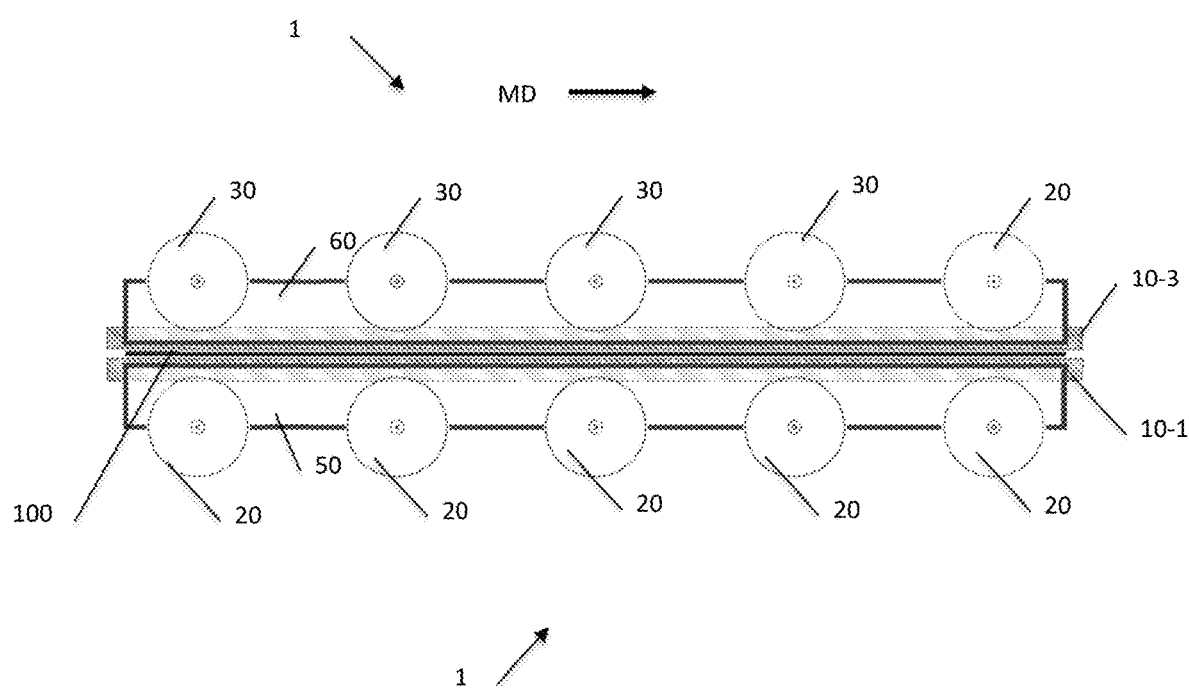
FIG. 8 shows a side view of the base structure of the embodiment according to FIG. 3.

FIG. 8 shows an area of the base structure 1 from the side. The upper rope 10-3 is guided by the roller elements 30 of the upper guide unit 60, the lower rope 10-1 is guided by the roller elements 20 of the guide unit 50. The upper guide unit is supported vertically movably such that the foil 100 extending between the ropes 10-1 and 10-3 is clamped by the ropes. Thus, the foil 100 is taken along by the movement of the ropes, and is transported through the transport device. Here, all roller elements 20, 30 have the same diameter and are arranged oppositely. However, this does not have to be like this always.

In the area II (stretching portion), the left ropes and the right ropes are guided such that they diverge in transport direction MD at an angle, which is opened in the transport direction MD such that the foil 100 may be stretched. Hereby, the stretching of the foil is effected transversally with respect to the transport direction MD, namely, in TD direction.

According to the requirements, the base structures may be configured so as to fix the ropes in transverse direction TD with respect to the transport direction MD and in vertical direction. For this, roller elements may be provided respectively, which contribute to the fixation.

Figure 9:
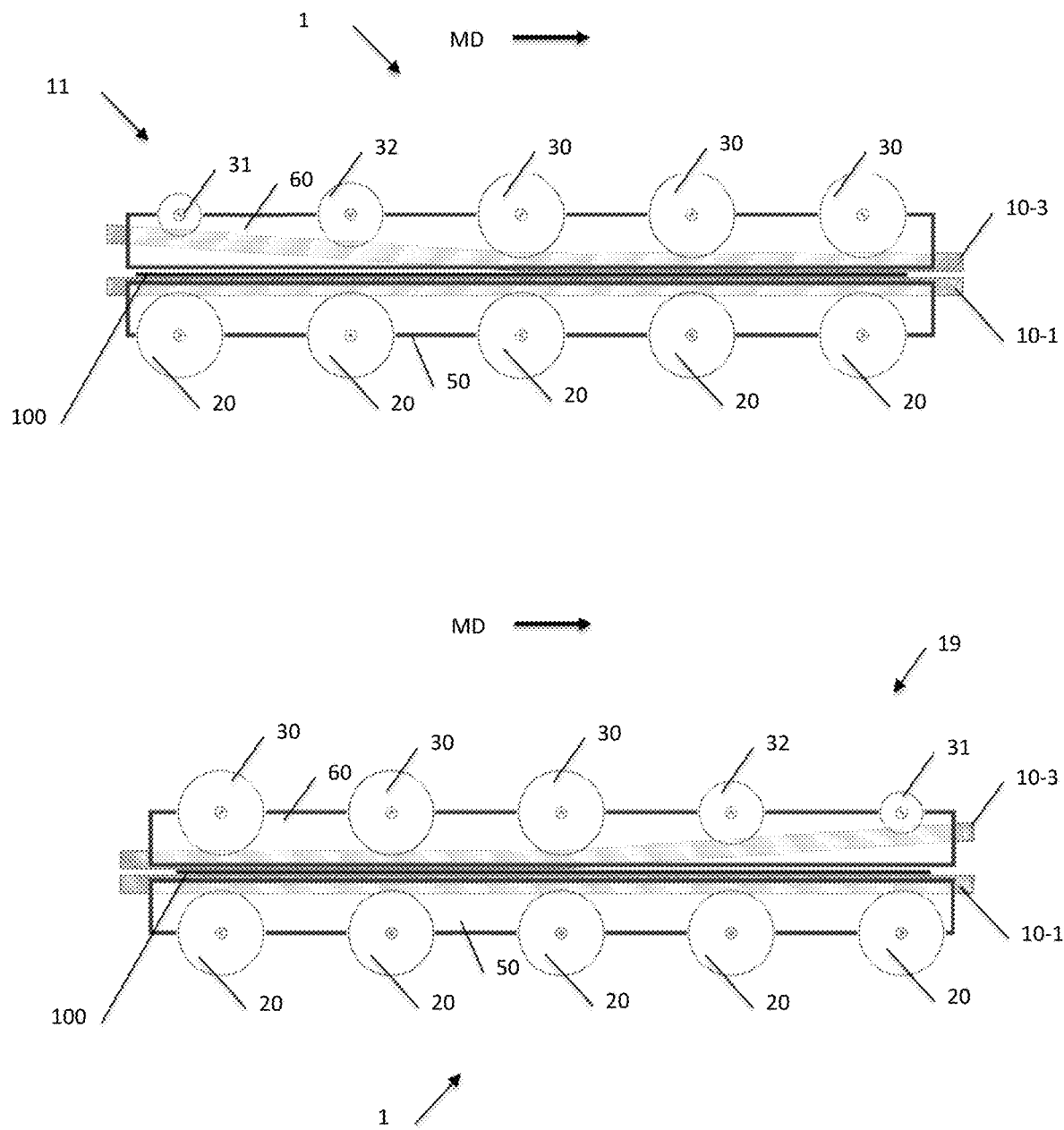
FIG. 9 shows a side view of the inlet area (top) and the outlet area (bottom) of the base structure of the embodiment according to FIG. 3.

FIG. 9 schematically shows the situation at the inlet 11 of the foil transport device (upper figure), namely, in the area, where the foil 100 is taken up into the foil transport device, and at the outlet 19 of the foil transport device (lower figure), namely, in the area, where the foil 100 is discharged. At the inlet 11, the at least one upper rope 10-3 and the at least one lower rope 10-1 form an angle, which is opened in a vertical plane against the transport direction MD such that the foil may be inserted between the ropes.

At the outlet 11, the foil 100 is threaded laterally between the upper rope 10-3 and the lower rope 10-1, respectively. Here, the two ropes are directed towards each other in a vertical distance with respect to each other which is reduced in transport direction MD: This may be realized by the roller elements 30 of one of the guide units, e.g., the upper one 60 for the upper rope 10-3, having different diameters at the inlet of the plant, wherein the first roller element 31 has the smallest diameter and in MD, subsequent roller elements 32, 30 have an increasing diameter. The centers of all roller elements 30, 31, 32 then may be situated on a common horizontal line MD, viewed from the side. Alternatively, the diameter of the roller elements may be equal and the roller elements at the inlet are lying on a decreasing line in MD (not shown in the figure). Also, a combination of both measures as possible. This way, the ropes are merged in MD in order to grip the foil and to clamp it. At the outlet 19, namely, in transport direction MD, at the ending of the foil transport device, the at least one upper rope and the at least one lower rope form an angle, which is opened in a vertical plane in the transport direction MD such that the foil can be released from a clamping between the ropes. There, the foil may be released from the device, its edge may be cut, and the foil may be further processed, and e.g., may be wound up on a roll. This is illustrated in the lower image of FIG. 9.

Thus, at the outlet 19, the ropes diverge so as to release the foil 100 from the clamping by the ropes. Here, the diameter of the roller elements 30, 31, 32, e.g., of the upper guide unit 60 for the upper rope 10-3 decreases in transport direction MD towards the outlet. The last roller element 31 has the smallest diameter. These centers of the roller elements 30, 31, 32 may be situated on a horizontal line, viewed from the side. Alternatively, the roller elements 30 may also have constant diameters, but may be arranged on a rising line, viewed in MD (not shown in the figure).

Everywhere, where the foil 100 is transported but is not stretched, guiding of the ropes 10-1, 10-2, 10-3 by means of vertically arranged roller elements, which also have a horizontal rotation axis, may be sufficient, because the transverse forces occurring there are low, there are no stretching forces.

This is the case at the outlet as well as in the area I, namely, there, where the foil is preheated, but is not stretched, as well as behind the stretching zone.

In the area II, namely, there, where the foil is stretched transversally, in addition to the vertical guide by the roller elements described above, a horizontal guide by means of roller elements 40 may be added, which are arranged horizontally, namely, which have a particular rotation axis in order to increase the clamping forces and to transmit stretching forces to the foil 100. The rollers are arranged so as to create a preferably constant and continuous pressure on the ropes and thus, a clamped foil.

The transition between the areas I and II, namely, there where the pure transport mode is transferred into the TD stretching mode, may be configured differently. Thus, already the first guide unit 50 (or 60) in the area II may be set outwards about the full angle, wherein the subsequent guide units 50 (or 60) are arranged in a straight line with respect to the first guide unit 50 (or 60) in the area II.

Figure 10:
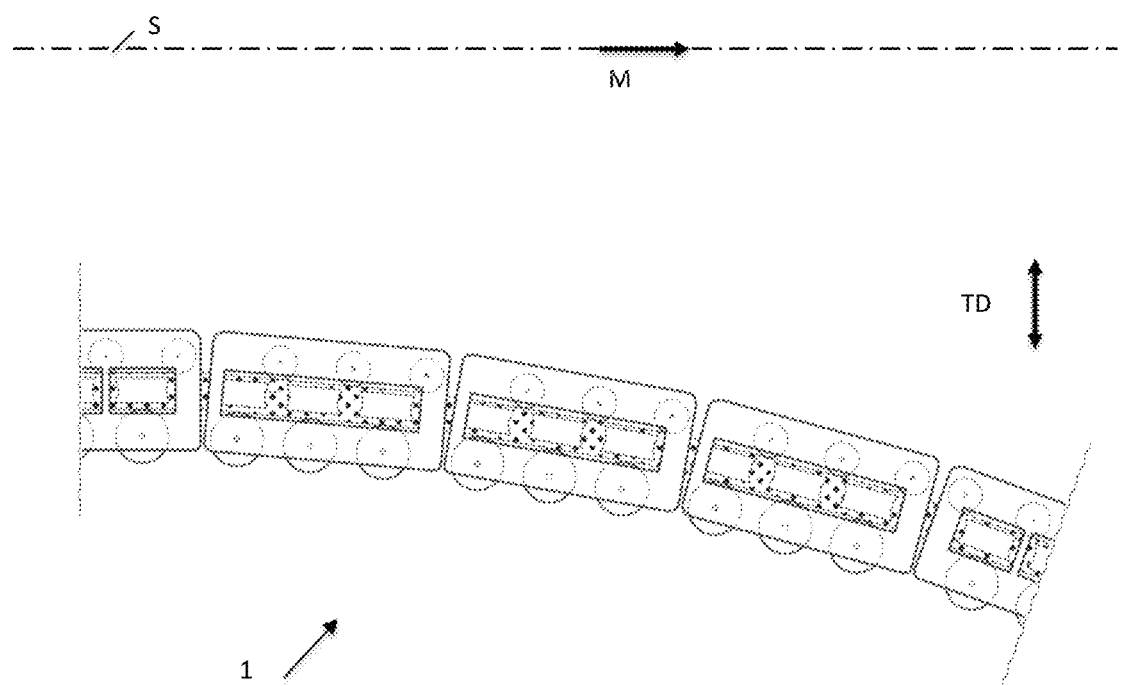
FIG. 10 shows an angle adjustment over several (short) guide units.

Alternatively, the angle adjustment may be realized by means of several shorter guide units 50 (or 60) being respectively displaced with respect to each other in smaller angles, as is shown in FIG. 10. In this case, also possible shear forces, which may occur with offset ropes at the foil edge in the area of the deflection of these ropes due to the different paths of the ropes in this area, may be dispersed over a larger distance and to several smaller angles MD, and thereby, may be minimized.

Here, also rollers 45 arranged horizontally may be used for the deflection.

As to the roller elements 20, 30, 40, these do not have to be situated completely within the interior of the respective guide rails or guide units 50, 60. At least the upper 30 and the lower roller elements 20 may partly run within or partly outside of the guide units. Thus, they may be monitored visually and maintained more easily. But also the lateral roller elements 40 may partly lie inside, partly outside of the guide units 50, 60.

For the purpose of maintenance, the roller elements can be replaced individually from the outside by removing the corresponding axes upwards or downwards. Simple inspection and exchangeability of the roller elements increase the productivity of the plant, because downtimes are reduced.

The guide units 50, 60 may also be configured such that they may be separated from each other as a whole and may be replaced.

For the configuration of the guide units 50, 60, there still exist numerous further modifications, e.g., in order to optimize the guiding of the ropes, to minimize the number of the roller elements 20, 30, 40 in order to optimize the weight of the guide units or the accessibility of the roller elements, for example, for maintenance purposes.

Figure 11:
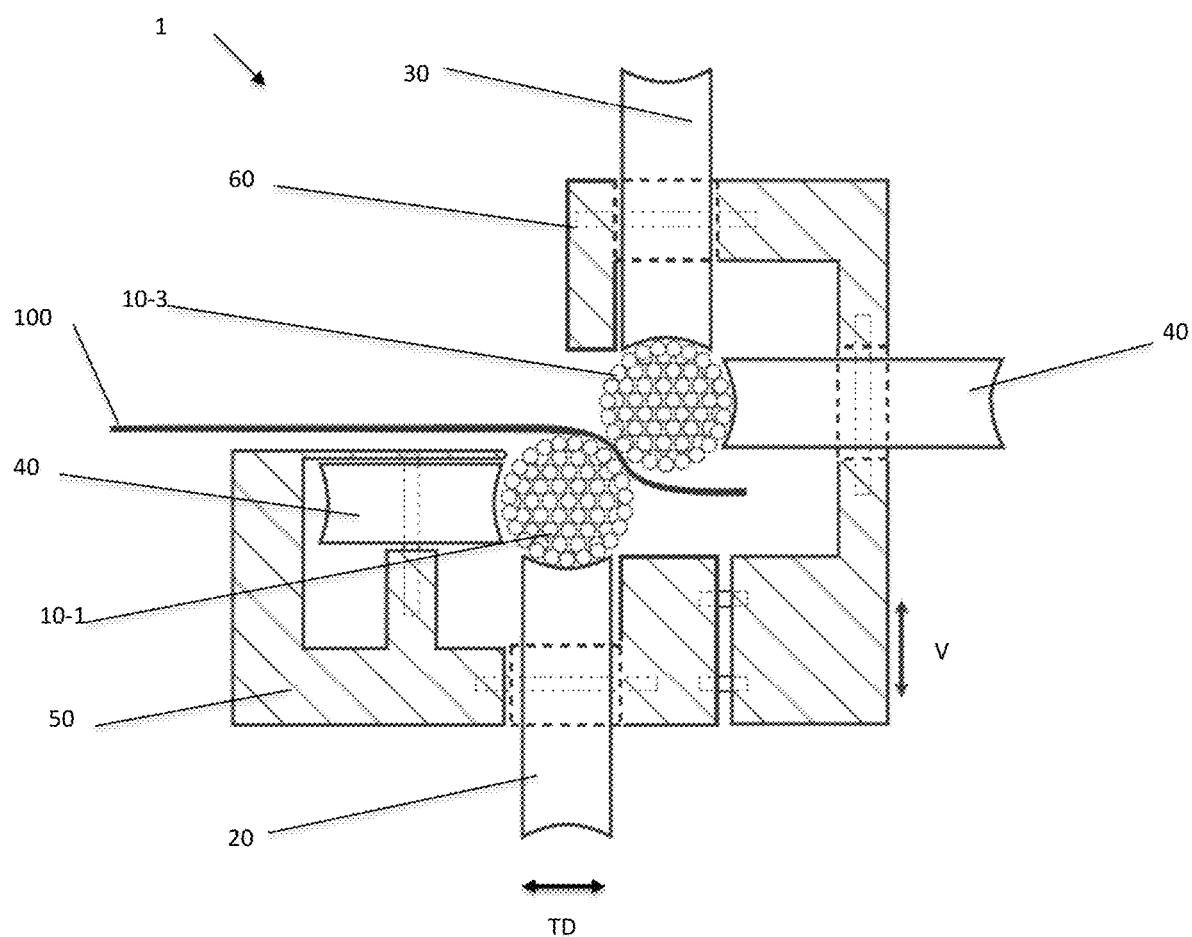
FIG. 11 shows a modification of the guide unit of the embodiment according to FIG. 5.

FIG. 11 to FIG. 14 show modifications of the guide units 50, 60 described above. FIG. 11 shows a modification of the embodiment according to FIG. 5. Here, the horizontal roller element 40 directed towards the foil center of the upper guide unit 60 and the horizontal outer roller element 40 in the lower guide unit 50 are omitted such that the guide rails supporting the roller elements may be simplified.

Figure 12:
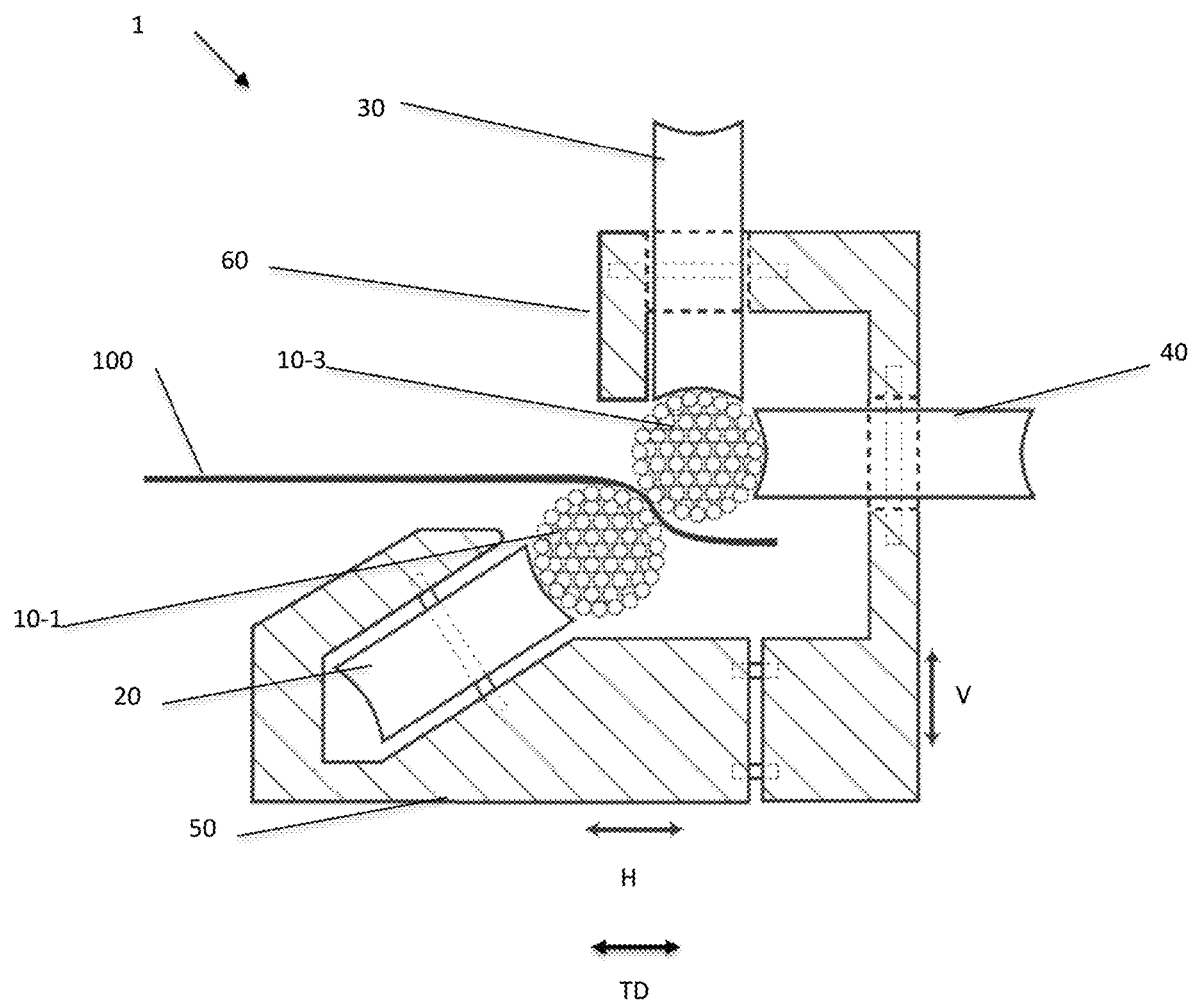
FIG. 12 shows a modification of the guide unit the embodiment according to FIG. 5.
Figure 13:
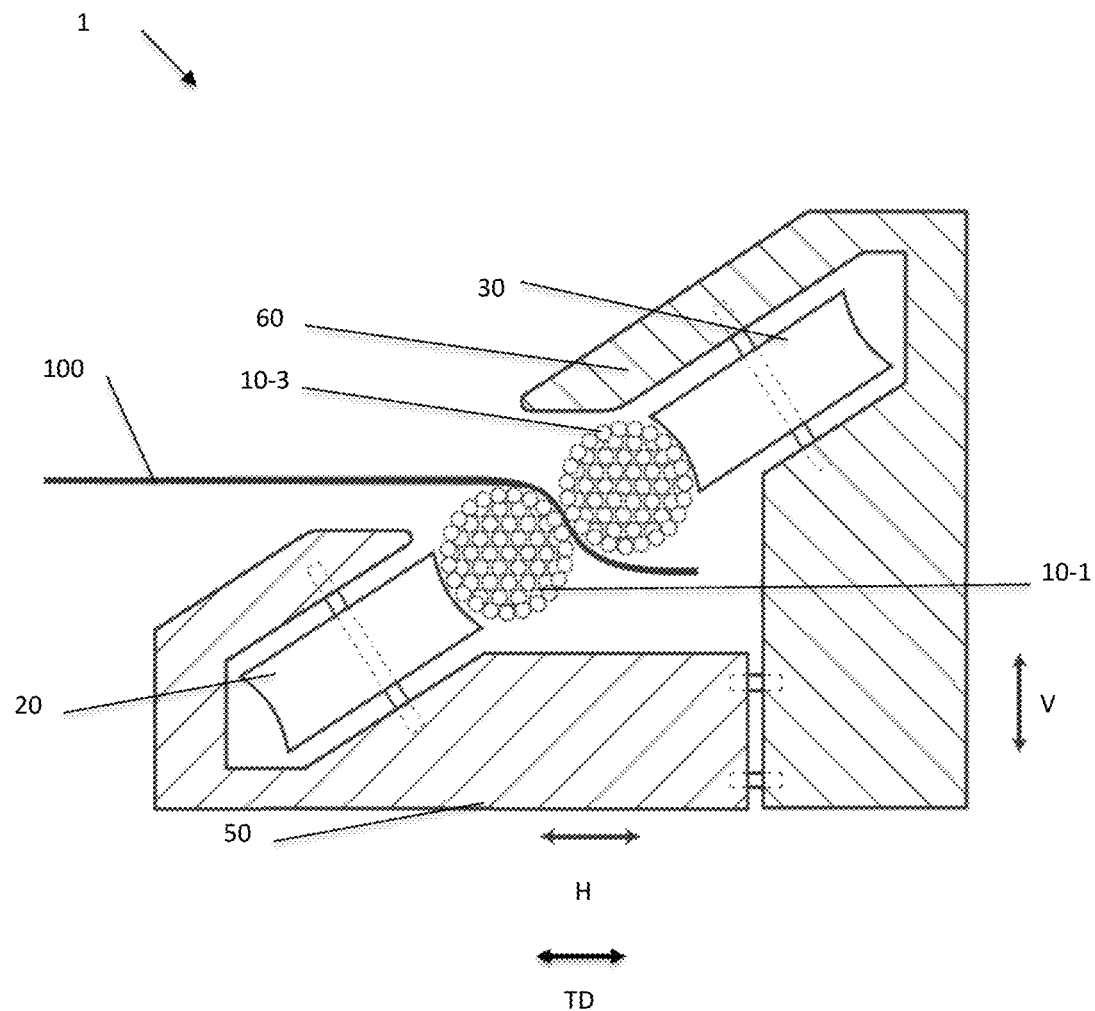
FIG. 13 shows a further modification of the guide unit of the embodiment according to FIG. 5.
Figure 14:
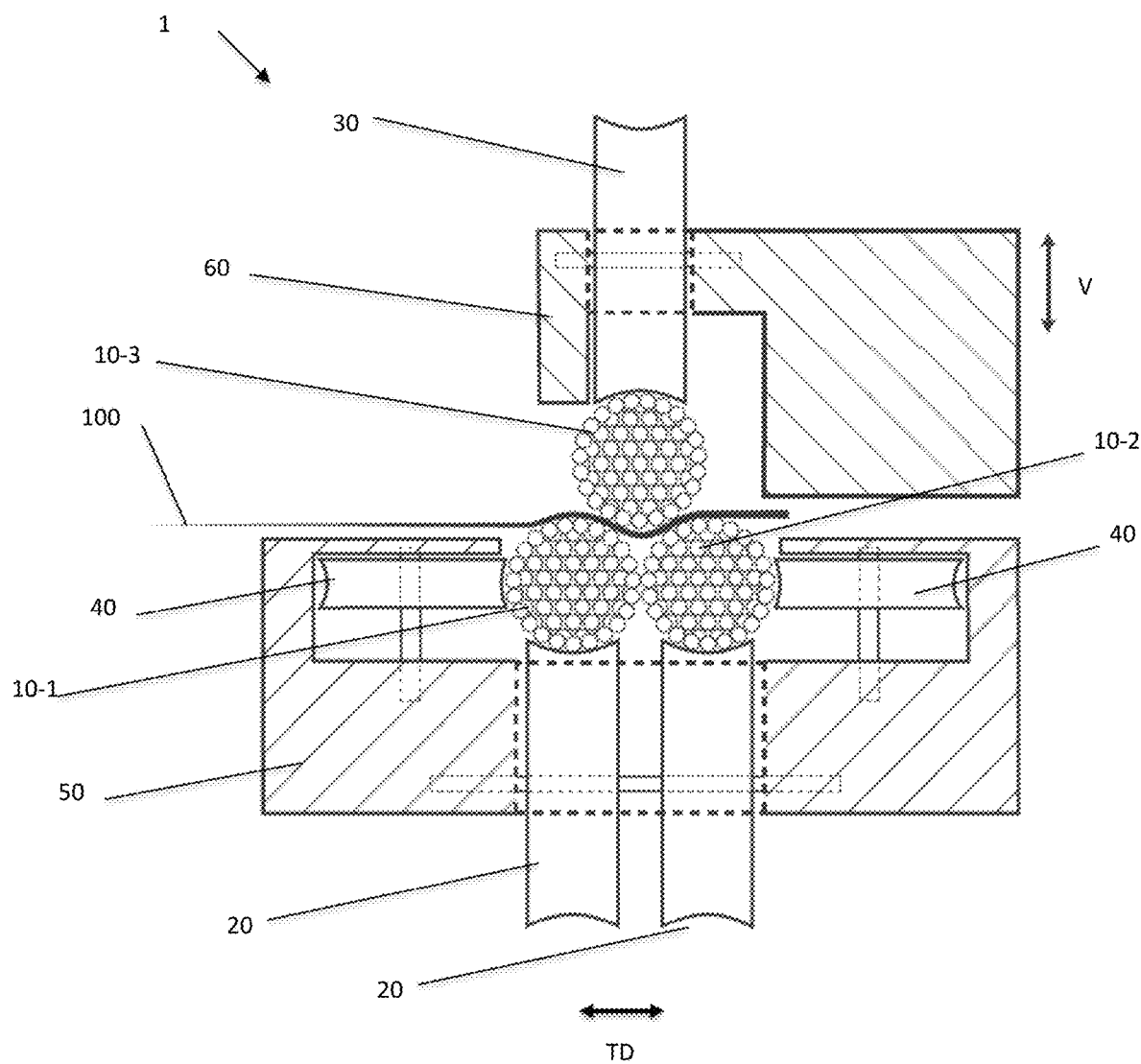
FIG. 14 shows a modification of the guide unit of the embodiment according to FIG. 6.

A further simplification of the embodiment may be achieved by roller elements 20, 30 being arranged in an inclined manner in the lower 50 and/or upper guide units 60. FIG. 12 shows an inclined arrangement in the lower guide unit 50, FIG. 13 shows this for both guide units 50, 60. Hereby, further roller elements may be omitted such that one roller element 20, 30 per guide unit 50, 60 may be sufficient.

The guide units 50, 60 are made from metal, also the roller elements 20, 30, 40, 45, 81, 82, 83, 84. Other materials are possible also, if they have sufficient mechanical and thermal stability.

Figure 15:
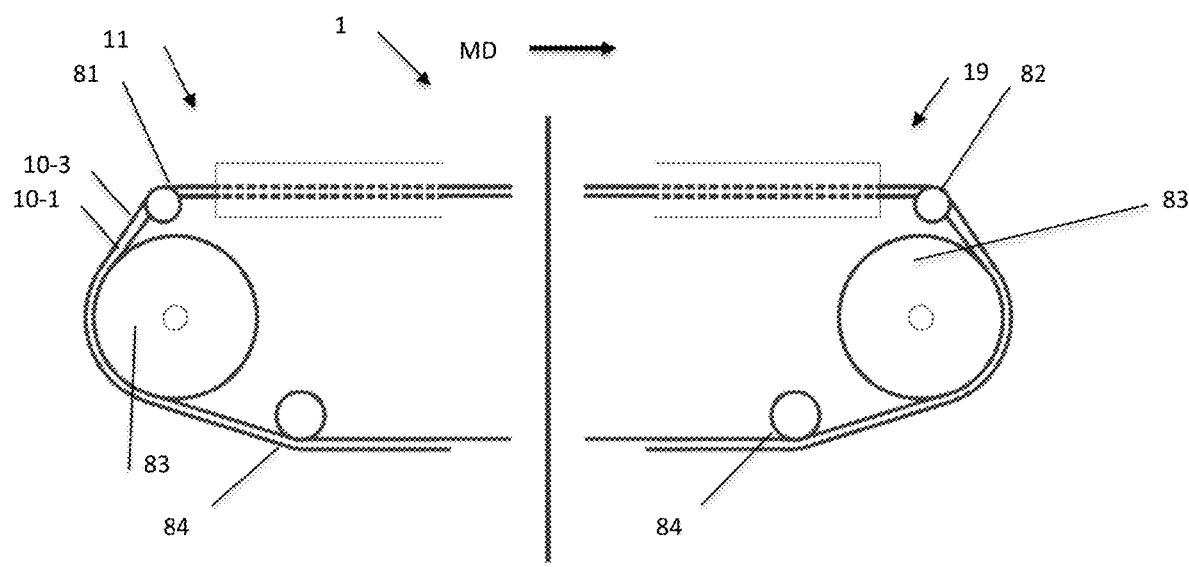
FIG. 15 shows a further top view on one half of the plant.

FIG. 15 shows the device schematically from the top. The ropes 10-1, 10-3 replace the chain and the clips of the prior art, the guide units 50, 60 (rail units) guide the ropes via roller elements 20, 30, 40, 45.

The two or three ropes are deflected and driven about a 2- or 3-story deflection and drive system at the stretching furnace entrance and at the stretching furnace exit.

The deflection and drive of the ropes, however, may also result from deflection and drive wheels arranged vertically (not shown in the figure).

In the return path of the ropes, the rope tensioning and also the rope cooling, respectively, are carried out. The return path may be arranged within the stretching furnace in parallel as well as also outside of the delegation furnace at the same height or, in order to facilitate the access to the furnace, may be arranged above the latter. For this, the device comprises at least one roller element for driving respectively one rope 10-1, 10-2, 10-3 and at least one roller element 84 for tensioning the respective rope 10-1, 10-2 10-3, and additional roller elements 81 four guiding and deflecting the respective rope.

Preferably, the main drive of the ropes is arranged in front of and behind the deflection itself. The deflection by means of a deflection roller element provides the necessary rope tensioning in the outbound path, whereas the rope tensioning at the return path of the ropes is of mirror importance. Additional drives may be added to the main drive, which are arranged at another position of the rope.

The ropes are driven such that they all run at the same speed. In addition to the drive of the ropes, there also may be provided a drive acting directly onto the foil 100.

For this, the edges of the foil 100, which are created by the lateral cutting of the foil 100 behind the outlet 19, may be drawn.

The foil transport device, preferably, allows for folding the guide rails over the entire furnace length and at the outset. This results from a displacement of all guide rails and the entire deflection at the outlet with all drives.

The degree of the stretching of the foil 100 in the area II may be designed modifiable in an easy manner by fixedly mounting the rope deflection and the drive wheels in the outermost position in the outlet. By positioning a small roller element 82 for deflection on a rail behind the last opening part, the latter may be displaced together with this rail. Only the respective rope length has to be compensated for in the return path of the rope, which e.g. is possible by means of further roller elements for deflection.

A similar function, although to a substantially lower extent, is assumed by the roller element 81 at the inlet, there, it compensates for the slight horizontal displacements of the foil usually measured there, and reacts together with the inlet unit and the corresponding measurement means.

The return path of the rope may run in parallel to the outbound path or outside of the stretching furnace at the same height or via deflection rolls above the stretching furnace and a straight return path rail. Additionally, devices for tensioning, cooling, monitoring, and cleaning the ropes 10-1, 10-2, 10-3 may be arranged in the return path.

The entire arrangement of the rope cycle may be accomplished via drive and diversion wheels arranged horizontally but also via drive and diversion wheels arranged vertically.

The invention claimed is:

1. Base structure for a device for transporting and stretching foil, wherein the base structure comprises:
    at least one upper guide unit and a lower guide unit,
    wherein the upper guide unit is configured so as to guide at least one upper moveable rope, and the lower guide unit is configured so as to guide at least one lower movable rope,
    wherein the at least one upper movable rope and the at least one lower movable rope can be arranged so as to clamp the foil at its lateral edge at least in places and to take it along, and
    wherein the at least one upper guide unit is configured so as to push the foil by means of the at least one upper movable rope guided by the upper guide unit against the at least one lower movable rope guided by the lower guide unit,
    wherein each guide unit of the upper guide unit and the lower guide unit comprises a number of roller elements which are configured so as to guide the at least one upper movable rope and the at least one lower movable rope, respectively,
    wherein at least one roller element of the number of roller elements is arranged below the least one lower movable rope guided by the lower guide unit, and
    wherein at least one roller element of the number of roller elements is arranged at the at least one upper guide unit above the upper movable rope guided by the at least one upper guide unit,
    wherein at least two roller elements of the number of roller elements are arranged at the lower guide unit so as to clamp the at least one lower movable rope directly inbetween them against the at least one upper movable rope.

2. Base structure according to claim 1, wherein the clamping of the foil is effected by mutually opposing roller elements and their pressure on the ropes, which act on the ropes.

3. Base structure to claim 1, wherein the foil can be clamped between the at least one upper rope on an upper foil surface and the at least one lower rope on a lower foil surface.

4. Base structure according to claim 1, wherein the upper rope has a direction of lay different from the at least one lower rope.

5. Device for the transport of foil in a transport direction comprising:
    at least two base structures according to claim 1,
    wherein one base structure is a right base structure arranged on a right-hand side in the transport direction and the other base structure is a left base structure arranged on a left-hand side in transport direction,
    wherein each of the at least two base structures are configured so as to guide the at least one upper movable rope and the at least one lower movable rope guided by them at same velocity.

6. Device according to claim 5, further comprising: an inlet portion, at which the at least one upper rope and the at least one lower rope form an angle, which is opened in a vertical plane against the transport direction such that the foil can be inserted between the ropes, and an outlet portion, at which the at least one upper rope and the at least one lower rope form an angle, which is opened in a vertical plane in the transport direction such that the foil can be released from a clamping between the ropes.

7. Device according to claim 6, further comprising:
    an elongation portion, in which the ropes of the left base structure and the ropes of the right base structure are guided such that they diverge at an angle in the transport direction, the angle being opened in the transport direction such that the foil can be stretched between the ropes on the left base structure and the ropes on the right base structure.

8. Device according to claim 6, further comprising: a roller element at the inlet portion wherein the roller element is arranged adjustably so as to adjust the inlet width of the foil, and a roller element at the outlet portion, wherein the roller element is arranged adjustably so as to adjust the outlet width of the foil.

9. Device according to claim 5,
    wherein each base structure is configured so as to fix the ropes guided by the corresponding base structure in a transverse direction with respect to the transport direction and vertically with respect to the transport direction, wherein the number of roller elements are provided, respectively, which contribute to the fixation.

10. Method for transporting foil in a transport direction, wherein the method is carried out in a device according to claim 5, wherein the at least one upper movable rope and the at least one lower movable rope are guided, and the at least one upper movable rope and the at least one lower movable rope clamp the foil at its lateral edge at least in places and take it along, wherein the foil is clamped between the at least one upper rope on an upper foil surface and the at least one lower rope on a lower foil surface.

11. Method according to claim 10, wherein the foil is guided on the left side and on the right side in transport direction.

12. Method according to claim 10, wherein the upper movable rope and the lower movable rope are guided by the number of roller elements.

13. Base structure according to claim 1, wherein the foil is either one of polyolefin raw material, polyester, polyamide, PLA, polystyrene, polycarbonates, or the foil is a semi-crystalline thermoplastic material.

\* \* \* \* \*